United States Patent
Liu et al.

(10) Patent No.: US 11,489,774 B2
(45) Date of Patent: Nov. 1, 2022

(54) METHOD AND SYSTEM FOR COUNTING QUANTITY OF ACTIVE FLOWS AND NETWORK DEVICE

(71) Applicant: Huawei Technologies Co., Ltd., Shenzhen (CN)

(72) Inventors: Mengzhu Liu, Beijing (CN); Yali Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/206,804

(22) Filed: Mar. 19, 2021

(65) Prior Publication Data
US 2021/0211379 A1    Jul. 8, 2021

Related U.S. Application Data

(63) Continuation of application No. PCT/CN2019/104734, filed on Sep. 6, 2019.

(30) Foreign Application Priority Data

Sep. 25, 2018  (CN) .......................... 201811119974.9

(51) Int. Cl.
*H04L 47/12* (2022.01)
(52) U.S. Cl.
CPC .................................... *H04L 47/12* (2013.01)
(58) Field of Classification Search
CPC ......... H04L 47/11; H04L 47/12; H04L 47/26; H04L 47/2483; H04L 47/115; H04L 43/026; H04L 43/062; H04L 43/0876
See application file for complete search history.

(56) References Cited

U.S. PATENT DOCUMENTS

| 8,982,694 B2 * | 3/2015 | Zhang ..................... H04W 8/04 370/310 |
| 9,001,663 B2 * | 4/2015 | Attar ....................... H04L 47/10 709/235 |
| 2005/0111367 A1 | 5/2005 | Jonathan Chao et al. |

(Continued)

FOREIGN PATENT DOCUMENTS

| CN | 102546202 A | 7/2012 |
| CN | 103916329 A | 7/2014 |

(Continued)

*Primary Examiner* — Mohamed A Kamara
(74) *Attorney, Agent, or Firm* — Conley Rose, P.C.

(57) ABSTRACT

The method includes a first network device receives a first packet of a first group of data packets from a second network device, and increases a current quantity of active flows by 1, to obtain a first quantity of active flows, the first network device receives a last packet of the first group of data packets sent by the second network device, and determines a first congestion value based on a second quantity of data packets that carry an explicit congestion notification (ECN) identifier in the first group of data packets, and when the first congestion value is less than a congestion threshold, the first network device decreases the first quantity of active flows by 1, to obtain a third quantity of active flows, or when the first congestion value is greater than or equal to the congestion threshold, the first network device keeps the first quantity of active flows unchanged.

20 Claims, 4 Drawing Sheets

(56) References Cited

U.S. PATENT DOCUMENTS

| | | | |
|---|---|---|---|
| 2007/0028003 A1* | 2/2007 | Rudkin | H04L 12/1489 |
| | | | 709/241 |
| 2015/0263959 A1* | 9/2015 | Patwardhan | H04L 43/0858 |
| | | | 370/235 |
| 2016/0255009 A1 | 9/2016 | Ramaiah et al. | |
| 2017/0187641 A1 | 6/2017 | Lundqvist et al. | |
| 2018/0069786 A1 | 3/2018 | Lokman et al. | |
| 2021/0211379 A1 | 7/2021 | Liu et al. | |
| 2021/0211380 A1 | 7/2021 | Liu et al. | |

FOREIGN PATENT DOCUMENTS

| | | |
|---|---|---|
| CN | 104734905 A | 6/2015 |
| CN | 106533970 A | 3/2017 |
| CN | 107078967 A | 8/2017 |
| CN | 107431666 A | 12/2017 |
| CN | 109067665 A | 12/2018 |
| CN | 109245959 A | 1/2019 |
| WO | 2014153780 A1 | 10/2014 |

* cited by examiner

METHOD AND SYSTEM FOR COUNTING QUANTITY OF ACTIVE FLOWS AND NETWORK DEVICE

CROSS-REFERENCE TO RELATED APPLICATIONS

This application is a continuation of International Patent Application No. PCT/CN2019/104734 filed on Sep. 6, 2019, which claims priority to Chinese Patent Application No. 201811119974.6 filed on Sep. 25, 2018. The disclosures of the aforementioned applications are hereby incorporated by reference in their entireties.

TECHNICAL FIELD

This application relates to the field of network technologies, and more specifically, to a method and a system for counting a quantity of active flows and a network device.

BACKGROUND

In many scenarios, to understand a status of a data flow received by a network device, a quantity of active data flows received by the network device usually needs to be counted. For example, in the congestion control and bandwidth allocation field, a quantity of active flows in a network needs to be counted, and then congestion control or bandwidth allocation is performed based on the quantity of active flows.

In a conventional solution, whether a data flow is an active flow is usually determined based on whether a data packet is received in a fixed time window, and then a quantity of active flows is counted. For example, if the network device receives a data packet of a first data flow in a first time window, it is determined that the first data flow is an active flow, and a quantity of active flows is increased by 1, in other words, counter++ is performed. The counter represents the quantity of active flows currently received by the network device. If the network device does not receive the data packet of the first data flow in the first time window, it is determined that the first data flow is a non-active flow, and counter-- is performed.

However, in a different scenario, for example, in a different networking mode, a different traffic model, and a grid architecture in which congestion may occur, if a quantity of active flows is still counted in the manner of counting a quantity of active flows based on a fixed time window in the conventional solution, the quantity of active flows may be inaccurately counted, and consequently the counted quantity of active flows cannot reflect a real status of data flow transmission in a network. Therefore, how to better count the quantity of active flows is a problem to be resolved.

SUMMARY

This application provides a method and a system for counting a quantity of active flows and a network device, to more accurately count a quantity of active flows.

According to a first aspect, a method for counting a quantity of active flows is provided, and the method includes a first network device receives a first packet of a first group of data packets sent by a second network device, and increases a current quantity of active flows by 1, to obtain a first quantity of active flows, the first network device receives a last packet of the first group of data packets sent by the second network device, and determines a first congestion value based on a quantity of data packets that carry an explicit congestion notification (ECN) identifier in the first group of data packets, and when the first congestion value is less than a congestion threshold, the first network device decreases the first quantity of active flows by 1, to obtain a second quantity of active flows, or when the first congestion value is greater than or equal to the congestion threshold, the first network device keeps the first quantity of active flows unchanged.

Optionally, the method is applied to a data center network or a metropolitan area network, and the second network device is configured to send a data packet to the first network device.

Optionally, the first congestion value is used to indicate a congestion degree of a first network in which the first network device receives the data packet sent by the second network device.

It should be understood that a larger first congestion value indicates a higher congestion degree of the first network.

The congestion threshold may be a preset threshold, and the congestion threshold may be specifically a threshold estimated based on a network status. A relatively small congestion threshold may be set in a scenario with relatively low bandwidth utilization, and a relatively large congestion threshold may be set in a scenario with relatively high bandwidth utilization.

For example, in a scenario with relatively low bandwidth utilization, the congestion threshold may be specifically 0.3, 0.4, 0.5, or the like, and in a scenario with relatively high bandwidth utilization, the congestion threshold may be specifically 0.6, 0.7, 0.8, or the like.

It should be understood that when the first packet of the first group of data packets is received, the current quantity of active flows needs to be increased by 1, to obtain the first quantity of active flows. The current quantity of active flows herein is a quantity of active flows that is counted before the first network device receives the first packet of the first group of data packets. When the first packet of the first group of data packets is received, the quantity of active flows needs to be updated, that is, the quantity of active flows that is counted before the first packet of the first group of data packets is received is increased by 1.

After the last packet of the first group of data packets is received, the first quantity of active flows needs to be updated again based on the quantity of data packets that carry the ECN identifier in the first group of data packets. If the first congestion value is less than the congestion threshold, a quantity of active flows that is counted by the first network device after the last packet of the first group of data packets is received is the second quantity of active flows. If the first congestion value is less than the congestion threshold, a quantity of active flows that is counted by the first network device after the last packet of the first group of data packets is received is the first quantity of active flows. In other words, the quantity of active flows that is counted after the last packet of the first group of data packets is received is the first quantity of active flows (when the first congestion value is greater than or equal to the congestion threshold) or the second quantity of active flows (when the first congestion value is less than the congestion threshold).

The ECN identifier may be a congestion identifier added by another network device (which may be specifically a switching device) between the first network device and the second network device when receiving a data packet.

The first packet of the first group of data packets may be a data packet that appears first in the first group of data packets received by the first network device, and the last packet of the first group of data packets may be a data packet that appears last in the first group of data packets received by the first network device. A quantity of data packets in each group of data packets may be preset.

Optionally, each data packet further includes a data packet identifier, and the data packet identifier is used to indicate a type of the data packet. Specifically, a value of the identifier may be used to indicate that the data packet is a first packet, a last packet, or a data packet between a first packet and a last packet of a group of data packets.

Specifically, the data packet identifier may be carried in a packet header or a payload of the packet. Alternatively, the data packet identifier may be carried in a field other than the packet, and the field that carries the data packet identifier is transmitted together with the packet, so that the first network device can identify a type of the data packet based on the field.

For example, in a scenario of remote direct memory access over converged Ethernet version 2 (RoCEv2), the data packet identifier may be carried in an opcode field in an RoCEv2 packet, or the data packet identifier may be carried in a reserved field (for example, an rsvd7 field) in an RoCEv2 packet.

It should be further understood that data packets in the first group of data packets belong to a same data flow. According to the method for collecting statistics on an active data flow in this application, statistics on any data flow received by the first network device may be collected, to obtain the quantity of active flows received by the first network device.

In this application, when a last packet of a group of data packets is received, a congestion status may be determined based on a quantity of data packets that carry the ECN identifier in the group of data packets, and then a quantity of active flows may be corrected based on the congestion status. In this way, the quantity of active flows can be more accurately counted, to obtain a more accurate quantity of active flows.

Specifically, in a conventional solution, a network congestion status is not considered when a quantity of active flows is counted. Actually, in the conventional solution, the quantity of active flows is counted based on an ideal situation in which no network congestion occurs. When network congestion occurs, a quantity of data packets received by a receive end in a period of time is affected, and consequently the quantity of active flows is inaccurately counted. In this application, statistics on data packets that carry the ECN identifier in each group of data packets are collected, so that network congestion can be estimated. When there is a relatively low network congestion degree, a quantity of active flows may be decreased by 1. When there is a relatively high network congestion degree, a quantity of active flows may be kept unchanged. In this way, impact of network congestion on counting of the quantity of active flows can be reduced, and the quantity of active flows can be more accurately counted.

With reference to the first aspect, in some implementations of the first aspect, the determining a first congestion value based on a quantity of data packets that carry an ECN identifier in the first group of data packets includes determining a ratio of the quantity of data packets that carry the ECN identifier in the first group of data packets to a quantity of data packets in the first group of data packets as the first congestion value.

Optionally, the determining a ratio of the quantity of data packets that carry the ECN identifier in the first group of data packets to a quantity of data packets in the first group of data packets as the first congestion value includes determining a ratio of a total quantity of data packets that carry the ECN identifier in the first group of data packets to a total quantity of data packets in the first group of data packets as the first congestion value.

It should be understood that each of the first packet, the last packet, and a data packet between the first packet and the last packet in the first group of data packets may carry the ECN identifier. When each data packet in the first group of data packets carries the ECN identifier, it indicates relatively serious network congestion. When there are a relatively small quantity of data packets that carry the ECN identifier in the first group of data packets, it indicates a relatively low network congestion degree (or a relatively smooth network).

Alternatively, a ratio of a total quantity of data packets that carry the ECN identifier in the first group of data packets to a total quantity of data packets in the first group of data packets may be first obtained, and then a product of the ratio and a correction coefficient is used as the first congestion value. The correction coefficient may be a coefficient set based on a running status of the network.

In this application, the first congestion value is determined based on the data packet that carries the ECN identifier in the first group of data packets, to reflect a current congestion status in real time, and therefore the quantity of active flows can be more accurately counted based on the current congestion status.

With reference to the first aspect, in some implementations of the first aspect, before the first congestion value is determined, the method further includes determining that a data flow to which the first group of data packets belongs is a first data flow. The first data flow is a data flow in which a quantity of data packets received by the second network device is greater than a preset quantity.

Data flows may be classified as a large data flow and a small data flow based on a data volume of a data packet. When the second network device receives a relatively large quantity of data packets of a data flow, it may be considered that the data flow is a large data flow. When the second network device receives a relatively large quantity of data packets of a data flow, it may be considered that the data flow is a small data flow.

A criterion for classifying a data flow as a large data flow or a small data flow may vary with an application scenario. For example, for some conventional web services, a data flow whose data volume is greater than 100 kilobytes (KB) may be considered as an elephant flow (namely, a large data flow), and a data flow whose data volume is less than 100 KB may be considered as a mouse flow (namely, a small data flow).

The first data flow may be considered as a large data flow. In this application, the quantity of active flows is counted only for the first data flow (the solution of this application is suitable for counting the quantity of active flows for the large data flow), so that the solution of counting a quantity of active flows in this application is more targeted.

Specifically, there are a relatively small quantity of data packets in a small data flow, and when network congestion occurs, the small data flow is slightly affected, and there are a relatively large quantity of data packets in a large data flow, and when network congestion occurs, the large data flow is greatly affected. Therefore, for a small data flow, statistics on an active flow are not collected (that is, a small data flow is not considered as an active flow even if a data packet can be received). For a large data flow, a quantity of active flows may be counted by using the solution in this application.

With reference to the first aspect, in some implementations of the first aspect, after the first network device receives the last packet of the first group of data packets sent by the second network device, the method further includes the first network device receives a first packet of a second group of data packets sent by the second network device, and increases a third quantity of active flows by 1, to obtain a fourth quantity of active flows, where the second group of data packets and the first group of data packets belong to a same data flow, and when the first congestion value is less than the congestion threshold, the third quantity of active flows is equal to the second quantity of active flows, or when the first congestion value is greater than or equal to the congestion threshold, the third quantity of active flows is equal to the first quantity of active flows, the first network device receives a last packet of the second group of data packets sent by the second network device, and determines a second congestion value of the network based on a quantity of data packets that carry the ECN identifier in the second group of data packets and the first congestion value, and when the second congestion value is less than the congestion threshold, the first network device decreases the fourth quantity of active flows by 1, to obtain a fifth quantity of active flows, or when the second congestion value is greater than or equal to the congestion threshold, the first network device keeps the fourth quantity of active flows unchanged.

After the first packet of the second group of data packets is received, processing may be performed in a manner similar to that used after the first packet of the first group of data packets is received. After the last packet of the second group of data packets is received, the second congestion value is comprehensively determined with reference to the data packet that carries the ECN identifier in the second group of data packets and the first congestion value. In this way, it can be ensured that the second congestion value does not change greatly, and a slowly changing congestion value is obtained. Therefore, the counted quantity of active flows does not change greatly.

Optionally, after receiving the last packet of the second group of data packets sent by the second network device, the first network device may further comprehensively determine the second congestion value based on the quantity of data packets that carry the ECN identifier in the first group of data packets and the quantity of data packets that carry the ECN identifier in the second group of data packets.

Optionally, a ratio of a total quantity of data packets that carry the ECN identifier in the first group of data packets and the second group of data packets to a total quantity of data packets included in the first group of data packets and the second group of data packets is determined as the second congestion value.

With reference to the first aspect, in some implementations of the first aspect, the determining a second congestion value of the network based on a quantity of data packets that carry the ECN identifier in the second group of data packets and the first congestion value includes determining a third congestion value of the network based on the quantity of data packets that carry the ECN identifier in the second group of data packets, and determining the second congestion value according to a formula $con2=x1*con3+x2*con1$, where con3 represents the third congestion value, con1 represents the first congestion value, con2 represents the second congestion value, x1 represents a preset first weight value, and x2 represents a preset second weight value.

It should be understood that the method for counting a quantity of active flows in the embodiments of this application may be performed by a network device at a receive end, or may be performed by a switch device located between a transmit end and a receive end. When the method is performed by the switch device, the switch device may feedback a counted quantity of active flows to the receive end, and then the receive end sends the quantity of active flows to the transmit end.

According to a second aspect, a network device is provided. The network device includes a module configured to perform the method in various implementations of the first aspect.

According to a third aspect, a network device is provided. The network device includes a memory and a processor, and may further include a transceiver. The memory is configured to store a program. The processor is configured to execute the program stored in the memory. When the program stored in the memory is executed by the processor, the transceiver and the processor are configured to perform the method in various implementations of the first aspect.

According to a fourth aspect, a system for counting a quantity of active flows is provided. The system includes a first network device and a second network device. The second network device is configured to send a first group of data packets to the first network device. The first network device is configured to receive a first packet of the first group of data packets, and increase a current quantity of active flows by 1, to obtain a first quantity of active flows. The first network device is configured to receive a last packet of the first group of data packets, and determine a first congestion value based on a quantity of data packets that carry an ECN identifier in the first group of data packets. When the first congestion value is less than a congestion threshold, the first network device is configured to decrease the first quantity of active flows by 1, to obtain a second quantity of active flows. When the first congestion value is greater than or equal to the congestion threshold, the first network device is configured to keep the first quantity of active flows unchanged.

According to a fifth aspect, a computer-readable storage medium is provided. The computer-readable storage medium stores an instruction, and when the instruction is run on a computer, the computer is enabled to perform the method in various implementations of the first aspect.

According to a sixth aspect, a computer program product that includes an instruction is provided. When the instruction is run on a computer, the computer is enabled to perform the method in various implementations of the first aspect.

DESCRIPTION OF EMBODIMENTS

The following describes technical solutions of this application with reference to accompanying drawings.

Figure 1:
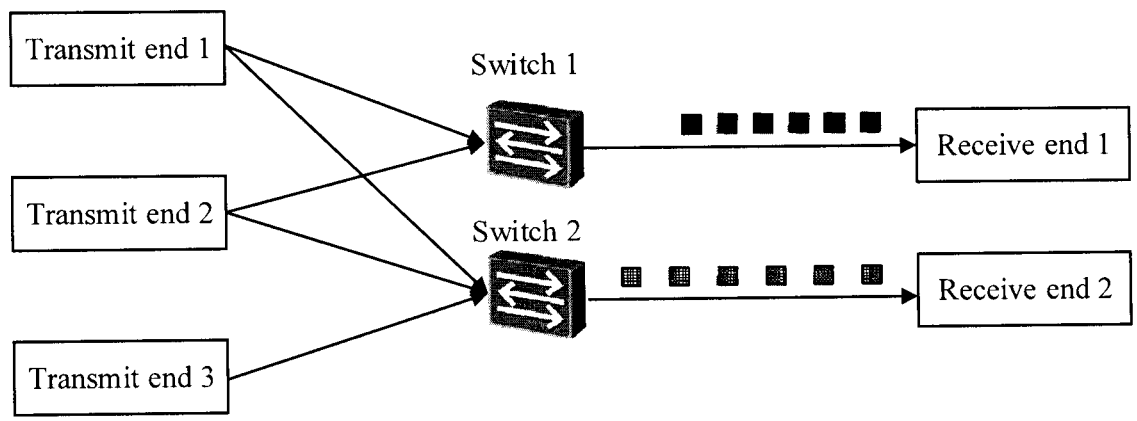
FIG. 1 is a schematic diagram of a possible application scenario according to an embodiment of this application.

FIG. 1 is a schematic diagram of a possible application scenario according to an embodiment of this application.

As shown in FIG. 1, a transmit end 1, a transmit end 2, and a transmit end 3 may send data flows to a receive end 1 and a receive end 2 by using a switch 1 and a switch 2. Both the receive end 1 and the receive end 2 may receive, by using the switch 1 and the switch 2, the data flows sent by the transmit end 1 to the transmit end 3 (the switch 1 and the switch 2 forward, to the receive end 1 and the receive end 2, the data flows sent by the transmit end 1 to the transmit end 3).

The receive end 1 is used as an example. The receive end 1 may collect statistics on a received data flow. For example, the receive end 1 may count a quantity of received active data flows (which may be referred to as a quantity of active flows), and feedback the quantity of active flows to the transmit end 1, the transmit end 2, and the transmit end 3 by using the switch 1 or the switch 2. In this way, the transmit end 1, the transmit end 2, and the transmit end 3 may adjust a data flow sending rate based on the quantity of active flows that is fed back by the receive end 1. It should be understood that FIG. 1 is an example schematic diagram of a possible application scenario according to an embodiment of this application, and the embodiments of this application may be alternatively applied to another scenario similar to that in FIG. 1.

In a conventional solution, when a quantity of active flows is counted, whether there is an active flow is usually determined based on whether a receive end receives a data packet in a fixed period of time (a fixed time window). If the receive end receives a data packet of a first data flow in the fixed period of time, the receive end determines that the first data flow is an active data flow, and increases a quantity of active flows by 1. If the receive end does not receive the data packet of the first data flow in the fixed period of time, the receive end determines that the first data flow is a non-active data flow, and in this case, the receive end decreases the quantity of active flows by 1. However, when network congestion occurs, the quantity of active flows may be inaccurately counted if the quantity of active flows is still counted based on whether a data packet is received in a fixed period of time. This is because data packet transmission may be delayed when network congestion occurs. Consequently, the receive end possibly cannot receive a data packet in the fixed period of time, and the quantity of active flows that is counted by the receive end is not accurate enough.

Therefore, the quantity of active flows needs to be counted with reference to a network congestion degree. When there is relatively serious network congestion, the receive end possibly cannot receive a data packet of a corresponding data flow in an original fixed time. In this case, the quantity of active flows should not be decreased by 1, but instead the quantity of active flows needs to be kept unchanged. However, when there is a relatively low network congestion degree, it may be considered that network congestion imposes little impact on data packet transmission. If the receive end cannot receive the data packet of the corresponding data flow in the original fixed time, the receive end needs to decrease the current quantity of active flows by 1.

Figure 2:
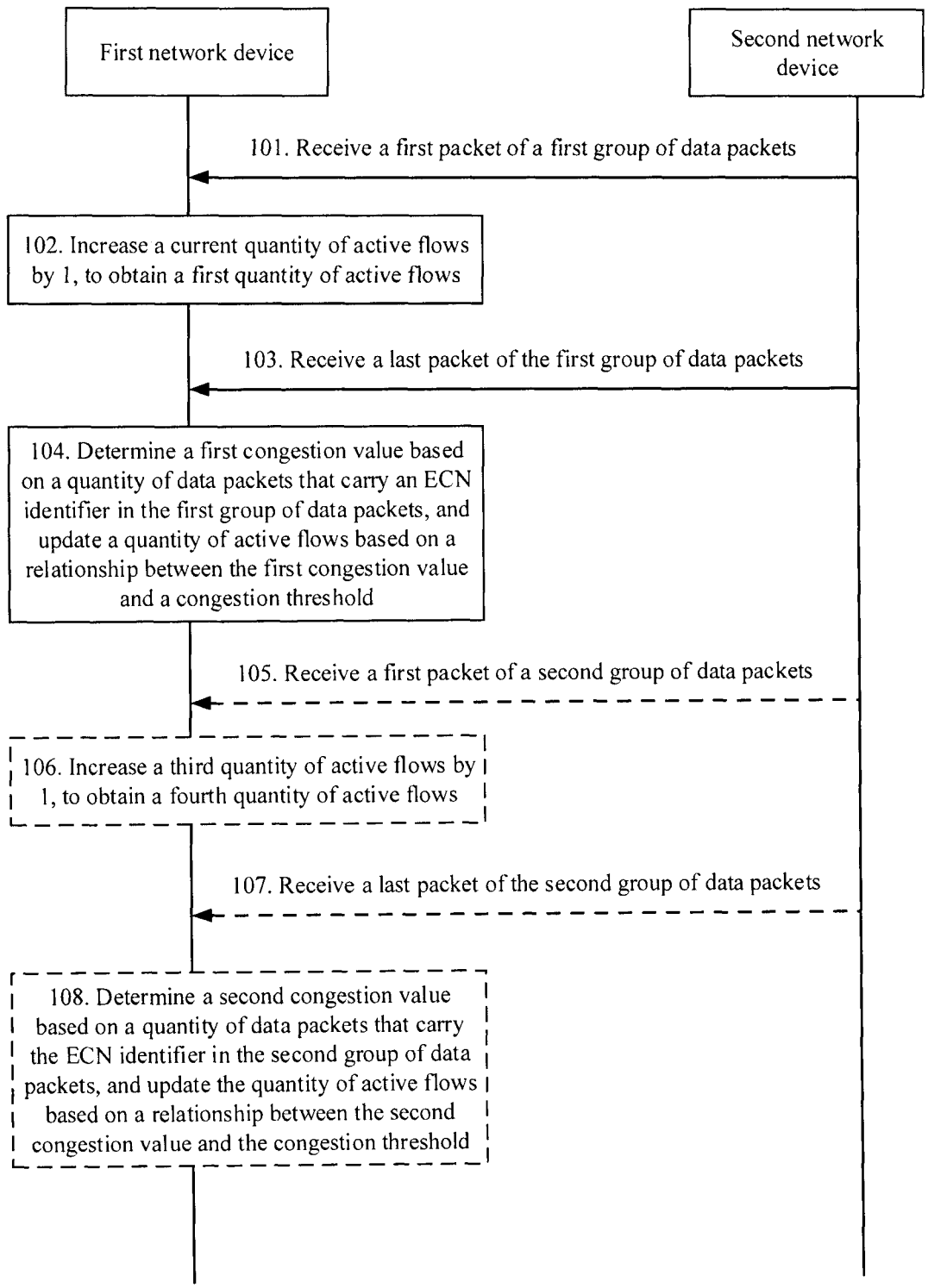
FIG. 2 is a schematic flowchart of a method for counting a quantity of active flows according to an embodiment of this application.
Figure 3:
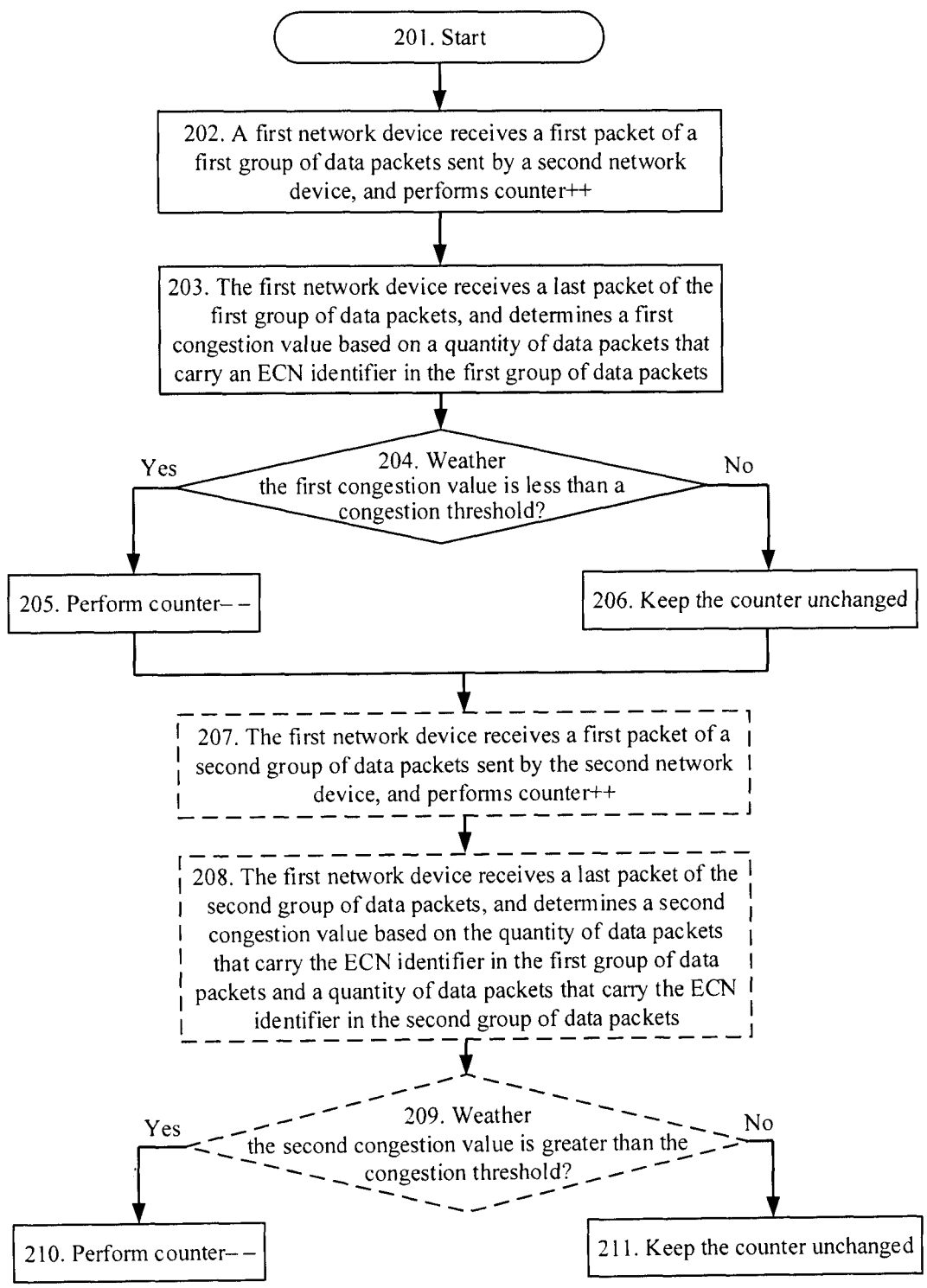
FIG. 3 is a schematic flowchart of a method for counting a quantity of active flows according to an embodiment of this application.
Figure 4:
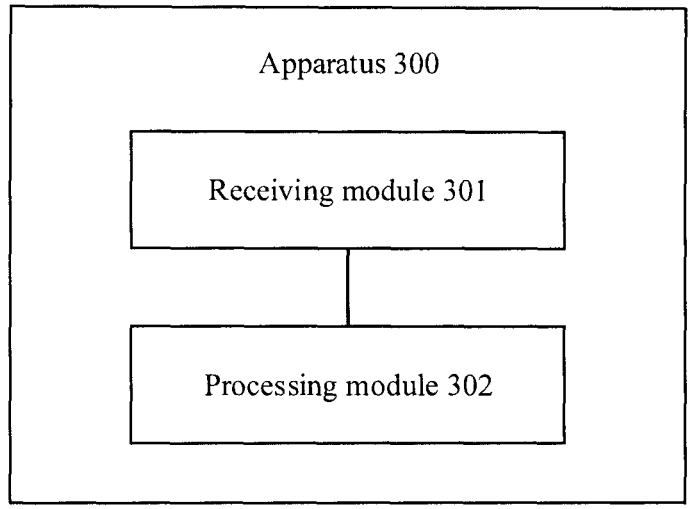
FIG. 4 is a schematic block diagram of a network device according to an embodiment of this application.

The following describes in detail a method for counting a quantity of active flows in the embodiments of this application with reference to FIG. 2 to FIG. 4.

FIG. 2 is a schematic flowchart of a method for counting a quantity of active flows according to an embodiment of this application. A first network device in FIG. 2 is equivalent to the receive end 1 or the receive end 2 in FIG. 1, and is configured to receive a data flow. A second network device in FIG. 2 is equivalent to the transmit end (the transmit end 1, the transmit end 2, or the transmit end 3) in FIG. 1, and is configured to send a data flow. The method shown in FIG. 2 may include at least step 101 to step 104. Further, the method shown in FIG. 2 may further include step 105 to step 108. The following describes these steps in detail.

101. The first network device receives a first packet of a first group of data packets.

In this application, each group of data packets includes a specific quantity of data packets, and each group of data packets includes a first packet and a last packet. After receiving a data packet, the first network device may identify whether the data packet is a first packet or a last packet by identifying whether the data packet carries a first packet identifier or a last packet identifier.

The first packet identifier and the last packet identifier are defined in two manners, and the two manners of defining the first packet identifier and the last packet identifier are described below.

First Manner

When this application is applied to an RoCEv2 scenario, based on a definition in an RoCEv2 protocol, data packets may be grouped based on a message. Specifically, data packets may be grouped based on a message (the message is a logical group of an application layer), a packet that appears first in the message is considered as a first packet, and a packet that appears last in the message is considered as a last packet. The first packet and the last packet may be specifically defined in an opcode field in a base transport header (BTH) of an RoCEv2 packet.

Second Manner

Data packets may be grouped based on a fragment or a segment. Specifically, data packets that are fed back based on an initial rate or a quantity of active flows and that correspond to a period may be grouped into a group, a packet that appears first in the fragment or the segment is referred to as a first packet, and a packet that appears last in the fragment or the segment is referred to as a last packet. The two fields may be defined in a reserved field (for example, an rsvd7 field) in a BTH, and a flag of each field may occupy 1 bit.

102. The first network device increases a current quantity of active flows by 1, to obtain a first quantity of active flows.

The current quantity of active flows in step 102 is a quantity of active flows that is counted before the first network device receives the first packet of the first group of data packets. When the first packet of the first group of data packets is received, the quantity of active flows needs to be updated, that is, the quantity of active flows that is counted before the first packet of the first group of data packets is received is increased by 1.

103. The first network device receives a last packet of the first group of data packets.

It should be understood that the first packet of the first group of data packets may be a data packet that appears first in the first group of data packets received by the first network device, and the last packet of the first group of data packets may be a data packet that appears last in the first group of data packets received by the first network device. A quantity of data packets in each group of data packets may be preset.

Optionally, each data packet further includes a data packet identifier, and the data packet identifier is used to indicate a type of the data packet. Specifically, a value of the identifier may be used to indicate that the data packet is a first packet, a last packet, or a data packet between a first packet and a last packet of a group of data packets.

Specifically, the data packet identifier may be carried in a packet header or a payload of the packet. Alternatively, the data packet identifier may be carried in a field other than the packet, and the field that carries the data packet identifier is transmitted together with the packet, so that the first network device can identify a type of the data packet based on the field.

For example, in a scenario of RoCEv2, the data packet identifier may be carried in an opcode field in an RoCEv2 packet, or the data packet identifier may be carried in a reserved field (for example, an rsvd7 field) in an RoCEv2 packet.

It should be understood that data packets in the first group of data packets belong to a same data flow.

104. The first network device determines a first congestion value based on a quantity of data packets that carry an ECN identifier in the first group of data packets, and updates the quantity of active flows based on a relationship between the first congestion value and a congestion threshold.

Optionally, in step 104, the first quantity of active flows needs to be updated again based on the quantity of data packets that carry the ECN identifier in the first group of data packets. If the first congestion value is less than the congestion threshold, a quantity of active flows that is counted by the first network device after the last packet of the first group of data packets is received is a second quantity of active flows. If the first congestion value is less than the congestion threshold, a quantity of active flows that is counted by the first network device after the last packet of the first group of data packets is received is the first quantity of active flows. In other words, the quantity of active flows that is counted after the last packet of the first group of data packets is received is the first quantity of active flows (when the first congestion value is greater than or equal to the congestion threshold) or the second quantity of active flows (when the first congestion value is less than the congestion threshold).

In this application, when a last packet of a group of data packets is received, a congestion status may be determined based on a quantity of data packets that carry the ECN identifier in the group of data packets, and then a quantity of active flows may be corrected based on the congestion status. In this way, the quantity of active flows can be more accurately counted, to obtain a more accurate quantity of active flows.

Specifically, in a conventional solution, a network congestion status is not considered when a quantity of active flows is counted. Actually, in the conventional solution, the quantity of active flows is counted based on an ideal situation in which no network congestion occurs. When network congestion occurs, a quantity of data packets received by a receive end in a period of time is affected, and consequently the quantity of active flows is inaccurately counted. In this application, statistics on data packets that carry the ECN identifier in each group of data packets are collected, so that network congestion can be estimated. When there is a relatively low network congestion degree, a quantity of active flows may be decreased by 1. When there is a relatively high network congestion degree, a quantity of active flows may be kept unchanged. In this way, impact of network congestion on counting of the quantity of active flows can be reduced, and the quantity of active flows can be more accurately counted.

Optionally, in an embodiment, the determining a first congestion value based on a quantity of data packets that carry an ECN identifier in the first group of data packets includes determining a ratio of the quantity of data packets that carry the ECN identifier in the first group of data packets to a quantity of data packets in the first group of data packets as the first congestion value.

Specifically, a ratio of a total quantity of data packets that carry the ECN identifier in the first group of data packets to the quantity of data packets in the first group of data packets may be determined as the first congestion value.

For example, the first group of data packets includes a total of 10 data packets (including the first packet and the last packet), and there are a total of five data packets that carry the ECN identifier. In this case, it can be calculated that the first congestion value is 0.5.

Alternatively, a ratio of a total quantity of data packets that carry the ECN identifier in the first group of data packets to a total quantity of data packets in the first group of data packets may be first obtained, and then a product of the ratio and a correction coefficient is used as the first congestion value. The correction coefficient may be a coefficient set based on a running status of a network.

For example, the first group of data packets includes a total of 10 data packets (including the first packet and the last packet), and there are a total of eight data packets that carry the ECN identifier. In this case, it can be calculated that the ratio of the total quantity of data packets that carry the ECN identifier to the total quantity of data packets is 0.8. If the correction coefficient is 0.8, a product 0.64 of the ratio and the correction coefficient is the first congestion value.

Optionally, before step 102, the method shown in FIG. 2 further includes determining that a data flow to which the first group of data packets belongs is a first data flow. The first data flow is a data flow in which a quantity of data packets received by the second network device is greater than a preset quantity.

The first data flow may be considered as a large data flow. In this application, the quantity of active flows is counted only for the first data flow (the solution of this application is suitable for counting the quantity of active flows for the large data flow), so that the solution of counting a quantity of active flows in this application is more targeted.

Specifically, there are a relatively small quantity of data packets in a small data flow, and when network congestion occurs, the small data flow is slightly affected, and there are a relatively large quantity of data packets in a large data flow, and when network congestion occurs, the large data flow is greatly affected. Therefore, for a small data flow, statistics on an active flow are not collected (that is, a small data flow is not considered as an active flow even if a data packet can be received). For a large data flow, a quantity of active flows may be counted by using the solution in this application.

Steps 101 to 104 show a case in which the quantity of active flows is counted based on one group of data packets. Actually, in the method for counting a quantity of active flows in this embodiment of this application, the quantity of active flows may further be counted based on a plurality of groups of data packets.

Optionally, in the method shown in FIG. 2, after receiving the first group of data packets and updating the quantity of active flows by using step 101 to step 104, the first network device may further continue to receive a second group of data packets, and update the quantity of active flows again based on the second group of data packets.

105. The first network device receives a first packet of the second group of data packets.

It should be understood that the second group of data packets and the first group of data packets belong to a same data flow, and the second group of data packets may be a group of data packets received by the first network device after receiving the first group of data packets. Specifically, the second group of data packets and the first group of data packets may be two consecutive groups of data packets in the data flow (that is, the second group of data packets is a next group of data packets received by the first network device after receiving the first group of data packets).

106. The first network device increases a current quantity of active flows by 1, to obtain a fourth quantity of active flows.

107. The first network device receives a last packet of the second group of data packets.

A specific process of step 105 to step 107 is similar to that of step 101 to step 103. Details are not described herein again.

108. The first network device determines a second congestion value based on a quantity of data packets that carry the ECN identifier in the second group of data packets, and updates the quantity of active flows based on a relationship between the second congestion value and the congestion threshold.

After the first packet of the second group of data packets is received, processing may be performed in a manner similar to that used after the first packet of the first group of data packets is received. After the last packet of the second data packet is received, the second congestion value is comprehensively determined with reference to the data packet that carries the ECN identifier in the second group of data packets and the first congestion value. In this way, it can be ensured that the second congestion value does not change greatly, and a slowly changing congestion value is obtained.

Optionally, after receiving the last packet of the second group of data packets sent by the second network device, the first network device may further comprehensively determine the second congestion value based on the quantity of data packets that carry the ECN identifier in the first group of data packets and the quantity of data packets that carry the ECN identifier in the second group of data packets.

Optionally, a ratio of a total quantity of data packets that carry the ECN identifier in the first group of data packets and the second group of data packets to a total quantity of data packets included in the first group of data packets and the second group of data packets is determined as the second congestion value.

For example, the first group of data packets and the second group of data packets each include 10 data packets, the first group of data packets includes four data packets that carry the ECN identifier, and the second group of data packets includes six data packets that carry the ECN identifier. In this case, the total quantity of data packets that carry the ECN identifier in the first group of data packets and the second group of data packets is 10, and the total quantity of data packets in the first group of data packets and the second group of data packets is 20, and therefore it is obtained that the second congestion value is 10/20=0.5.

It should be understood that during determining of the second congestion value, a congestion value may be obtained based on the quantity of data packets that carry the ECN identifier in the first group of data packets, another congestion value may be obtained based on the quantity of data packets that carry the ECN identifier in the second group of data packets, and then weighted summation is performed on the two congestion values, to obtain the second congestion value.

Optionally, in an embodiment, the determining a second congestion value of a network based on a quantity of data packets that carry the ECN identifier in the second group of data packets and the first congestion value includes determining a third congestion value of the network based on the quantity of data packets that carry the ECN identifier in the second group of data packets, and determining the second congestion value according to a formula (1):

$$con2 = x1 * con3 + x2 * con1 \qquad (1)$$

In the formula (1), con3 represents the third congestion value, con1 represents the first congestion value, con2 represents the second congestion value, x1 represents a preset first weight value, and x2 represents a preset second weight value.

It should be understood that in this application, the first network device needs to increase the current quantity of active flows by 1 each time the first network device receives a first packet of a group of data packets (for example, the first group of data packets and the second group of data packets). Each time the first network device receives a last packet of the group of data packets, the first network device needs to adjust the quantity of active flows (decrease the quantity of active flows by 1 or keep the quantity of active flows unchanged) based on a quantity of data packets that carry the ECN identifier in the group of data packets, to update the quantity of active flows in real time.

To better understand the method for counting a quantity of active flows in the embodiments of this application, the following describes the method for counting a quantity of active data flows in the embodiments of this application from a perspective of a first network device.

FIG. 3 is a schematic flowchart of a method for counting a quantity of active flows according to an embodiment of this application. The method shown in FIG. 3 may include at least step 201 to step 204. Further, the method shown in FIG. 3 may further include step 205 to step 208. The following describes these steps in detail.

201. Start counting a quantity of active flows.

Step 201 means to start counting the quantity of active flows.

202. A first network device receives a first packet of a first group of data packets sent by a second network device, and performs counter++.

The counter represents a current quantity of active flows that is counted by the first network device. Specifically, the counter represents a current quantity of active data flows that is counted by the first network device when the first network device receives the first packet of the first group of data packets sent by the second network device.

A counter obtained after counter++ is performed in step 202 represents a quantity of active flows that is obtained after the first packet of the first group of data packets is received and the current quantity of active flows is updated, and the counter obtained after counter++ is equivalent to the first quantity of active flows that is obtained in step 102.

203. The first network device receives a last packet of the first group of data packets, and determines a first congestion value based on a quantity of data packets that carry an ECN identifier in the first group of data packets.

204. Determine whether the first congestion value is greater than a congestion threshold.

When the first congestion value is less than or equal to the congestion threshold, it indicates a relatively low network congestion degree. In this case, a current quantity of active flows needs to be decreased by 1, in other words, step 205 is performed. When the first congestion value is greater than or equal to the congestion threshold, it indicates relatively serious network congestion. In this case, a current quantity of active flows needs to be kept unchanged, in other words, step 206 is performed.

205. Perform counter--.

In step 205, a counter obtained after counter-- is performed is equivalent to the foregoing second quantity of active flows.

206. Keep the counter unchanged.

In step 206, the counter is equivalent to the foregoing first quantity of active flows.

207. The first network device receives a first packet of a second group of data packets sent by the second network device, and performs counter++.

In step 207, a counter obtained after counter++ is performed is equivalent to the foregoing fourth quantity of active flows.

208. The first network device receives a last packet of the second group of data packets, and determines a second congestion value based on the quantity of data packets that carry the ECN identifier in the first group of data packets and a quantity of data packets that carry the ECN identifier in the second group of data packets.

209. Determine whether the second congestion value is greater than the congestion threshold.

When the second congestion value is less than or equal to the congestion threshold, it indicates a relatively low network congestion degree. In this case, a current quantity of active flows needs to be decreased by 1, in other words, step 210 is performed. When the second congestion value is greater than or equal to the congestion threshold, it indicates relatively serious network congestion. In this case, a current quantity of active flows needs to be kept unchanged, in other words, step 211 is performed.

210. Perform counter--.

In step 210, a counter obtained after counter-- is performed is equivalent to the foregoing fifth quantity of active flows.

211. Keep the counter unchanged.

In step 206, the counter is equivalent to the foregoing fourth quantity of active flows.

It should be understood that in step 201 to step 211 in the method shown in FIG. 3, the counter represents the current quantity of active flows. After different operation steps, an addition operation or a subtraction operation needs to be performed on the counter, or the counter is kept unchanged, to count the current quantity of active flows in real time.

Figure 5:
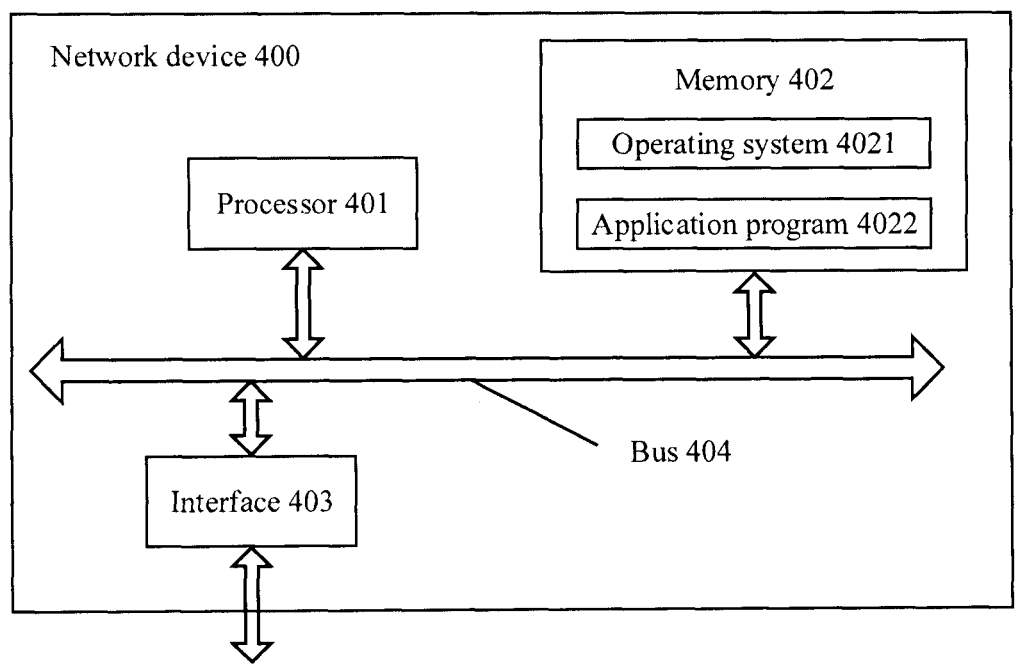
FIG. 5 is a schematic structural diagram of hardware of a network device 400 according to an embodiment of this application.

The foregoing describes in detail the method for counting a quantity of active flows in the embodiments of this application with reference to FIG. 1 to FIG. 3. The following describes network devices in the embodiments of this application in detail with reference to FIG. 4 and FIG. 5. It should be understood that the network devices shown in FIG. 4 and FIG. 5 can perform the method for counting a quantity of active flows in the embodiments of this application. For brevity, repeated description is properly omitted when the network devices shown in FIG. 4 and FIG. 5 are described below.

FIG. 4 is a schematic block diagram of a network device according to an embodiment of this application. A network device 300 in FIG. 4 includes a receiving module 301, configured to receive a first packet of a first group of data packets sent by another network device, and a processing module 302, configured to increase a current quantity of active flows by 1, to obtain a first quantity of active flows.

The receiving module 301 is further configured to receive a last packet of the first group of data packets sent by the another network device.

The processing module 302 is further configured to determine a first congestion value based on a quantity of data packets that carry an ECN identifier in the first group of data packets.

The processing module 302 is further configured to, when the first congestion value is less than a congestion threshold, decrease the first quantity of active flows by 1, to obtain a second quantity of active flows.

The processing module 302 is further configured to, when the first congestion value is greater than or equal to the congestion threshold, keep the first quantity of active flows unchanged.

In this application, when a last packet of a group of data packets is received, a congestion status may be determined based on a quantity of data packets that carry the ECN identifier in the group of data packets, and then a quantity of active flows may be corrected based on the congestion status. In this way, the quantity of active flows can be more accurately counted, to obtain a more accurate quantity of active flows.

Optionally, in an embodiment, the processing module 302 is configured to determine a ratio of the quantity of data packets that carry the ECN identifier in the first group of data packets to a quantity of data packets in the first group of data packets as the first congestion value.

Optionally, in an embodiment, before determining the first congestion value, the processing module 302 is further configured to determine that a data flow to which the first group of data packets belongs is a first data flow. The first data flow is a data flow in which a quantity of data packets received by the another network device is greater than a preset quantity.

Optionally, in an embodiment, after the receiving module 301 receives the last packet of the first group of data packets sent by the another network device, the receiving module 301 is further configured to receive a first packet of a second group of data packets sent by the another network device. The processing module 302 is further configured to increase a third quantity of active flows by 1, to obtain a fourth quantity of active flows. The second group of data packets and the first group of data packets belong to a same data flow, and when the first congestion value is less than the congestion threshold, the third quantity of active flows is equal to the second quantity of active flows, or when the first congestion value is greater than or equal to the congestion threshold, the third quantity of active flows is equal to the first quantity of active flows. The receiving module 301 is further configured to receive a last packet of the second group of data packets sent by the another network device. The processing module 302 is further configured to determine a second congestion value of the network based on a quantity of data packets that carry the ECN identifier in the second group of data packets and the first congestion value. The processing module 302 is further configured to, when the second congestion value is less than the congestion threshold, decrease the fourth quantity of active flows by 1, to obtain a fifth quantity of active flows. The processing module 302 is further configured to, when the second congestion value is greater than or equal to the congestion threshold, keep the fourth quantity of active flows unchanged.

Optionally, in an embodiment, the processing module 302 is configured to determine a third congestion value based on the quantity of data packets that carry the ECN identifier in the second group of data packets, and determine the second congestion value according to a formula con2=x1*con3+x2*con1, where con3 represents the third congestion value, con1 represents the first congestion value, con2 represents the second congestion value, x1 represents a preset first weight value, and x2 represents a preset second weight value.

FIG. 5 is a schematic structural diagram of hardware of a network device 400 according to an embodiment of this application. The network device 400 shown in FIG. 5 may perform the steps in the method for counting a quantity of active flows in the embodiments of this application.

As shown in FIG. 5, the network device 400 includes a processor 401, a memory 402, an interface 403, and a bus 404. The interface 403 may be implemented in a wireless or wired manner, and may be specifically a network adapter. The processor 401, the memory 402, and the interface 403 are connected by using the bus 404.

The interface 403 may specifically include a transmitter and a receiver. The receiver is configured to receive a data flow sent by a second network device, and the transmitter may be configured to send information about a quantity of active flows to the second network device. Specifically, the interface 403 may be configured to perform step 101, step 103, step 105, and step 107.

The processor 401 is configured to update a quantity of active flows. Specifically, the processor 401 may be configured to perform step 102, step 104, step 106, and step 108.

The memory 402 includes an operating system 4021 and an application program 4022, and is configured to store a program, code, or an instruction. When the processor or a hardware device executes the program, the code, or the instruction, a packet transmission process in the embodiments of this application may be completed.

Optionally, the memory 402 may include a read-only memory (ROM) and a random-access memory (RAM). The ROM includes a basic input/output system (BIOS) or an embedded system, and the RAM includes an application program and an operating system. When the network device 400 needs to be run, the BIOS or the embedded system that is built into the ROM is used to lead a system to start, and lead the network device 400 to enter a normal running state. After entering the normal running state, the network device 400 runs the application program and the operating system in the RAM, to complete a processing process related to the network device in the method embodiment.

It may be understood that FIG. 5 shows a simplified design of the network device. In actual application, the network device 400 may include any quantity of interfaces, processors, or memories.

An embodiment of this application further provides a system for counting a quantity of active flows. The system includes a first network device and a second device. The first network device and the second network device in the system may perform the steps of the first network device and the second network device in the method for counting a quantity of active flows in the embodiments of this application, and the first network device may further have a function of the network device in FIG. 4 or FIG. 5.

Persons of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for a purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is one example. For example, the unit division may be logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions include certain implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

The foregoing descriptions include certain implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

The invention claimed is:

1. A method, implemented by a first network device, wherein the method comprises:
   receiving a first packet of a first group of data packets from a second network device;
   increasing a current quantity of active flows by 1 to obtain a first quantity of active flows when the first packet of the first group is received;
   receiving a first last packet of the first group from the second network device;
   determining a first congestion value based on a second quantity of data packets that carry an explicit congestion notification (ECN) identifier in the first group; and
   decreasing the first quantity by 1 to obtain a third quantity of active flows when the first congestion value is less than a congestion threshold or keeping the first quantity unchanged when the first congestion value is greater than or equal to the congestion threshold.

2. The method of claim 1, further comprising determining a ratio of the second quantity to a fourth quantity of data packets in the first group of data packets as the first congestion value.

3. The method of claim 1, wherein before determining the first congestion value, the method further comprises determining that a data flow to which the first group belongs is a first data flow, wherein the first data flow includes a fourth quantity of data packets of the second network device that is greater than a preset quantity.

4. The method of claim 1, wherein after receiving the first last packet, the method further comprises:
   receiving a second packet of a second group of data packets from the second network device;
   increasing a fourth quantity of active flows by 1 to obtain a fifth quantity of active flows, wherein the second group and the first group belong to a same data flow;
   receiving a second last packet of the second group;
   determining a second congestion value of a network based on a sixth quantity of data packets that carry the ECN identifier in the second group of data packets and the first congestion value; and
   decreasing the fifth quantity by 1 to obtain a seventh quantity of active flows when the second congestion value is less than the congestion threshold or keeping the fifth quantity unchanged when the second congestion value is greater than or equal to the congestion threshold.

5. The method of claim 4, wherein the fourth quantity is equal to the third quantity when the first congestion value is less than the congestion threshold.

6. The method of claim 4, wherein the fourth quantity is equal to the first quantity when the first congestion value is greater than or equal to the congestion threshold.

7. The method of claim 4, further comprising:
   determining a third congestion value based on the sixth quantity; and
   determining the second congestion value according to a formula:

$$con2 = x1*con3 + x2*con1,$$

wherein con3 represents the third congestion value, wherein con1 represents the first congestion value, wherein con2 represents the second congestion value, wherein x1 represents a preset first weight value, and wherein x2 represents a preset second weight value.

8. A network device, comprising:
   a processor; and
   a memory coupled to the processor and configured to store instructions that, when executed by the processor, cause the network device to be configured to:
      receive a first packet of a first group of data packets from another network device;
      increase a current quantity of active flows by 1 to obtain a first quantity of active flows when the first packet of the first group is received;
      receive a first last packet of the first group from the another network device;
      determine a first congestion value based on a second quantity of data packets that carry an explicit congestion notification (ECN) identifier in the first group; and
      decrease the first quantity by 1 to obtain a third quantity of active flows when the first congestion value is less than a congestion threshold or keep the first quantity unchanged when the first congestion value is greater than or equal to the congestion threshold.

9. The network device of claim 8, wherein the instructions further cause the network device to be configured to determine a ratio of the second quantity to a fourth quantity of data packets in the first group of data packets as the first congestion value.

10. The network device of claim 8, wherein the instructions further cause the network device to be configured to determine that a data flow to which the first group belongs is a first data flow, wherein the first data flow includes a fourth quantity of data packets of the another network device that is greater than a preset quantity.

11. The network device of claim 8, wherein after the instructions cause the network device to receive the first last packet, the instructions further cause the network device to be configured to:
   receive a second packet of a second group of data packets from the another network device;
   increase a fourth quantity of active flows by 1 to obtain a fifth quantity of active flows, wherein the second group and the first group belong to a same data flow;
   receive a second last packet of the second group;
   determine a second congestion value of the network based on a sixth quantity of data packets that carry the ECN identifier in the second group of data packets and the first congestion value; and
   decrease the fifth quantity by 1 to obtain a seventh quantity of active flows when the second congestion value is less than the congestion threshold or keep the fifth quantity unchanged when the second congestion value is greater than or equal to the congestion threshold.

12. The network device of claim 11, wherein the fourth quantity is equal to the third quantity when the first congestion value is less than the congestion threshold.

13. The network device of claim 11, wherein the fourth quantity is equal to the first quantity when the first congestion value is greater than or equal to the congestion threshold.

14. The network device of claim 11, wherein the instructions further cause the network device to be configured to:
   determine a third congestion value based on the sixth quantity; and
   determine the second congestion value according to a formula:

$$con2 = x1*con3 + x2*con1,$$

wherein con3 represents the third congestion value, wherein con1 represents the first congestion value, wherein con2 represents the second congestion value, wherein x1 represents a preset first weight value, and wherein x2 represents a preset second weight value.

15. A computer program product comprising instructions that are stored on a non-transitory computer-readable medium and that, when executed by a processor, cause a network device to:
receive a first packet of a first group of data packets from another network device;
increase a current quantity of active flows by 1 to obtain a first quantity of active flows when the first packet of the first group is received;
receive a first last packet of the first group from the another network device;
determine a first congestion value based on a second quantity of data packets that carry an explicit congestion notification (ECN) identifier in the first group; and
decrease the first quantity by 1 to obtain a third quantity of active flows when the first congestion value is less than a congestion threshold or keep the first quantity unchanged when the first congestion value is greater than or equal to the congestion threshold.

16. The computer program product of claim 15, wherein the instructions further cause the network device to determine a ratio of the second quantity to a fourth quantity of data packets in the first group of data packets as the first congestion value.

17. The computer program product of claim 15, wherein the instructions further cause the network device to determine that a data flow to which the first group belongs is a first data flow, wherein the first data flow includes a fourth quantity of data packets of the another network device that is greater than a preset quantity.

18. The computer program product of claim 15, wherein after the network device is configured to receive the last packet, the instructions further cause the network device to:
receive a second packet of a second group of data packets from the another network device;
increase a fourth quantity of active flows by 1 to obtain a fifth quantity of active flows, wherein the second group and the first group belong to a same data flow, wherein the fourth quantity is equal to the third quantity when the first congestion value is less than the congestion threshold;
receive a second last packet of the second group;
determine a second congestion value of the network based on a sixth quantity of data packets that carry the ECN identifier in the second group of data packets and the first congestion value; and
decrease the fifth quantity by 1 to obtain a seventh quantity of active flows when the second congestion value is less than the congestion threshold or keep the fifth quantity unchanged when the second congestion value is greater than or equal to the congestion threshold.

19. The computer program product of claim 18, wherein the instructions further cause the network device to:
determine a third congestion value based on the sixth quantity; and
determine the second congestion value according to a formula:

$$con2 = x1*con3 + x2*con1,$$

wherein con3 represents the third congestion value, wherein con1 represents the first congestion value, wherein con2 represents the second congestion value, wherein x1 represents a preset first weight value, and wherein x2 represents a preset second weight value.

20. The computer program product of claim 15, wherein after the network device is configured to receive the last packet, the instructions further cause the network device to:
receive a second packet of a second group of data packets from the another network device;
increase a fourth quantity of active flows by 1 to obtain a fifth quantity of active flows, wherein the second group and the first group belong to a same data flow, wherein the fourth quantity is equal to the first quantity when the first congestion value is greater than or equal to the congestion threshold;
receive a second last packet of the second group;
determine a second congestion value of the network based on a sixth quantity of data packets that carry the ECN identifier in the second group of data packets and the first congestion value; and
decrease the fifth quantity by 1 to obtain a seventh quantity of active flows when the second congestion value is less than the congestion threshold or keep the fifth quantity unchanged when the second congestion value is greater than or equal to the congestion threshold.

* * * * *